United States Patent [19]

Giovannetti

[11] 4,202,645
[45] May 13, 1980

[54] READILY RELEASABLE CLAMPING CONNECTOR

[76] Inventor: Fiorello Giovannetti, Via Marciano 4, Milano, Italy

[21] Appl. No.: 958,205

[22] Filed: Nov. 7, 1978

[30] Foreign Application Priority Data

Nov. 10, 1977 [IT] Italy .............................. 22696/77[U]

[51] Int. Cl.² .......................... B25G 3/00; F16B 7/02; F16D 1/00; F16G 11/00
[52] U.S. Cl. ............................. 403/407; 403/DIG. 10
[58] Field of Search ................ 403/406, 407, DIG. 10

[56] References Cited

U.S. PATENT DOCUMENTS

| 215,348 | 5/1879 | Gregg | 403/403 X |
| 3,730,568 | 5/1973 | Giovannetti | 403/245 |

Primary Examiner—Wayne L. Shedd
Attorney, Agent, or Firm—Fleit & Jacobson

[57] ABSTRACT

Device for the fastening of parts, panels and the like as separable from one another, comprising a cylindrical body which can be rotatably accommodated within a circular opening in one of the parts to be connected, and a pin secured to project from the other part, the pin having a shank formed with an end head defining a shoulder which cooperates with cam surfaces of the cylindrical body circumferentially extending from inside towards the side surface along the edges of at least one of a pair of opposing arcuate slits formed in opposite directions each from one end of a transverse hole for the pin passage.

7 Claims, 4 Drawing Figures

READILY RELEASABLE CLAMPING CONNECTOR

This invention relates to a fastening device particularly designed for separably interconnecting two or more parts, such as panels or other elements, in the manufacture of furniture, shelvings or the like.

Many of such devices are already known, but the prior art devices are relatively large and accordingly of unpleasant sight and comparatively complicated use. Thus, it was proposed to design a fastening device of reduced size, while having the required strength, and particularly easy to use, so as to simplify assembling operations.

These objects are accomplished by the fastening device according to the present application.

Substantially, a fastening device comprises a cylindrical body rotably carried within a circular opening in one of the parts to be connected, and a pin secured to the other part for releasable engagement with said cylindrical body through a relative rotation of the latter, so that the parts to be secured are moved near one another and firmly interconnected.

Generally, according to the present invention, a device is provided for separable interconnection of parts, which device is characterized by comprising a cylindrical body which can be rotatably accomodated within a circular opening in one of such parts, and a pin projecting from the other part, the pin having a shank formed with an end head defining a shoulder for cooperation with cam surfaces of the cylindrical body circumferentially extending from inside towards the side surface of the body, along the opposing edges of at least one of a pair of arcuate slits formed in opposite directions from a transverse hole for the pin passage.

Preferably, the cylindrical body is formed with cam surfaces at both ends of the transverse hole for the pin passage, the surfaces spiral extending along the edges of arcuate slits oppositely directed along a preset arch from the ends of said transverse hole.

Preferably, the slit(s) extend through an angle of about 90° from the axis of the transverse hole for the pin passage, and the cam surfaces substantially define cams acting on the shoulder of the pin head for causing such a pin to slide longitudinally in the transverse passage hole as the cylindrical body rotates; such surfaces have a spiral pattern starting at an inner location from the transverse hole for the pin passage, and terminate at the outer surface with a substantially flat portion lying in a plane parallel to the axis of said transverse hole.

A fastening device according to the foregoing is characterized in that it can be very simply and economically made by plastic material moulding, for example of nylon or other suitable material, while maintaining the required strength and high reliability in clamping; thus, the construction of the device is such as to minimize the length of the arcuate slits communicating with the transverse hole for the pin passage, so that the structure of the cylindrical fastening body is by no way impaired. Additionally, a fastening device according to the present invention is not only of extremely simple and economical construction, but as well easy to assemble, requiring only few drilling or milling operations that can be mechanically performed along automatic assembling lines for the various parts to be connected.

The invention will be more particularly hereinafter illustrated with reference to the figures of the accompanying drawings, in which.

Figure 2:
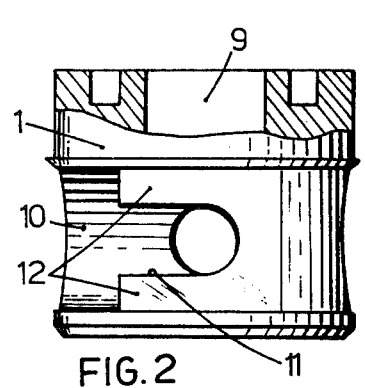
FIG. 2 is a first side view showing the cylindrical body.

As shown in FIG. 2, a fastening device substantially comprises a cylindrical body 1, for example of molded plastic material, accomodated within a circular bore or cavity of corresponding diameter formed in a part or panel 2 to be secured; the device further comprises a pin 3 passing through a hole 4 in part 2 and which is secured projectedly at one end thereof with a second part or panel 5 to be releasably secured with the former.

Figure 1:
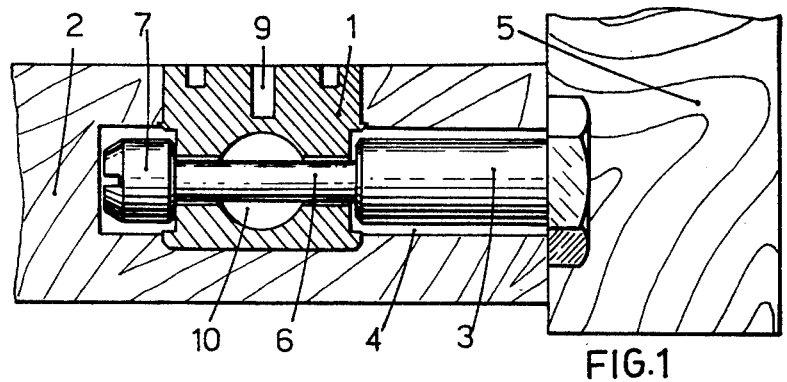
FIG. 1 is a sectional view showing two parts as secured to each other by the device according to the present invention.

As shown in FIG. 1, the axis of pin 3 is perpendicular to the axis of rotation of cylindrical body 1; pin 3 also has a shank 6 of reduced diameter passing through said cylindrical body 1, which shank terminates with an enlarged head 7. On the inwardly facing side, this head 7 defines a circular shoulder 8 for cooperation with cam surfaces of cylindrical body 1, as explained in the following, to firmly interconnect said panels 2 and 5. The rotation of cylindrical body 1 to engage and disengage said pin 4 may be accomplished by means of a tool, such as by a screwdriver or the like inserted in a notch 9 at the upper end of cylindrical body 1.

Figure 4:
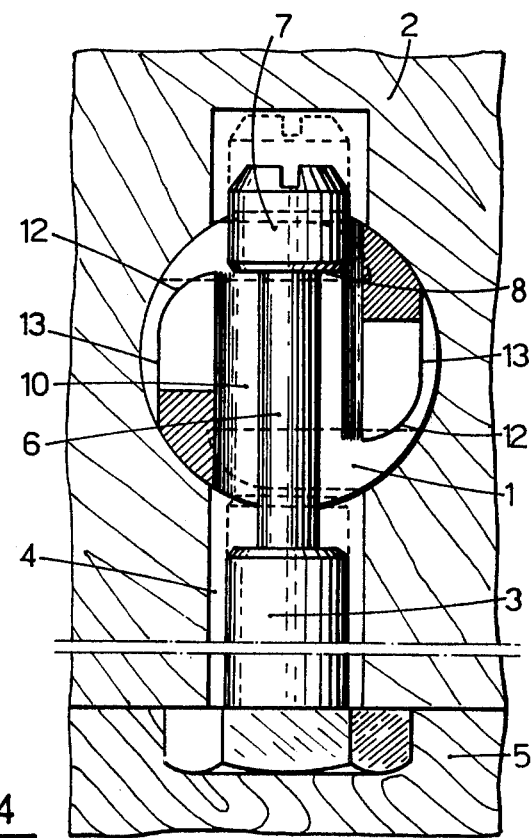
FIG. 4 is a sectional view through the fastening device and parts to be connected, indicatively along line 4—4 of FIG. 3; the unsecured position is shown by full line, while the secured position is shown by broken line.
Figure 3:
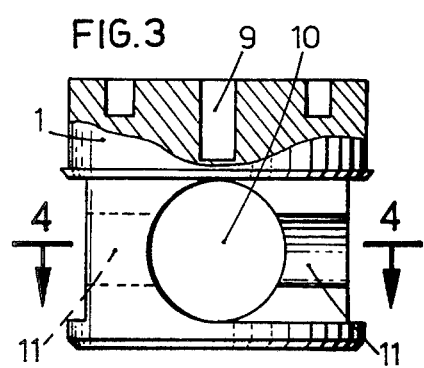
FIG. 3 is a second side view of the cylindrical body taken in a plane rotated by about 90° relative to the view of FIG. 2.

As shown in FIGS. 2, 3 and 4 of the accompanying drawings, said cylindrical body 1 has a transverse hole 10, the inner diameter of which corresponds to or is slightly larger than the outer diameter of pin head 7 for the passage thereof from one to the other side of the cylindrical body.

From both ends of transverse hole 10, cylindrical body 1 also has arcuate slits 11 extending in opposite directions in a plane at right angles to the axis of rotation of cylindrical body 1 and along arcs of circle extending by about 90° from the axis of hole 10. The width of these slits should be such as to allow the passage of pin shank 6 for a rotation of the cylindrical body relative to the pin.

Particularly, as shown in the aforesaid figures of the accompanying drawings, cam surfaces 12 are formed along the opposing edges of one or both slits 11, these surfaces having a first section of spiral pattern from inside to the external or side surface of body 1, and terminating with a flat or planar section 13 parallel arranged to the axis of transverse hole 10 for the pin passage.

As clearly appears from the example of FIG. 4, these cam surfaces 12 perform the function of cooperating with the inner annular shoulder 8 of pin head 7 to exert on said pin a tractive action tending to move said parts 2 and 5 close to each other, firmly interconnecting the same.

A partial rotation of cylindrical body 1 relative to pin 3 brings the cam surfaces 12 formed along the edges of one of slits 11 against said annular shoulder 8 of pin head 7, thereby exerting an axial push action on the pin, tending to cause the latter to slide along hole 10. Part 2 to be connected is firmly drawn against part 5 by simple rotation through 90° of cylindrical body 1 (broken line position in FIG. 4). The planar end section 13 of the cam surfaces performs the function of clamping the cylindrical body 1 at its rotated condition or clamping between the parts, avoiding that a casual return might otherwise cause the pin to slide off. The passage between the spiral section 12 of the cam surfaces and planar section 13 occurs by a slight snap action which can be sensed by the operator, who is thereby assured that clamping has been reliably carried out.

Changes or modifications can be made in that the cam surfaces may be provided along the edges of both arcuate slits extending from both ends of the transverse hole for the pin passage, so that the cylindrical body can be introduced into its associated seating without having to be previously oriented. Moreover, the cylindrical body 1 can be made of any suitable material, either metal or plastic material, the latter material being particularly suitable due to its low cost, while allowing the device to maintain a sufficiently rigid structure in the cylindrical body for assuring a firm clamping between the parts to be connected.

What is claimed is:

1. A device for releasably clamping a first part and a second part tightly together comprising:
   a first member comprising a one-piece cylindrical body accommodated within a circular opening in one of the parts to be connected for rotation about an axis;
   a second member comprising a protruding member secured to project from the other part;
   said protruding member having a reduced diameter shank portion and an enlarged head end portion defining a shoulder facing the shank portion; said one-piece cylindrical body having a through hole extending transverse to the rotation axis for receiving therethrough said shank and head end portions of said protruding member, said hole having a diameter at least equal to the diameter of said head end portion; a pair of opposing arcuate slits whose centerlines lie in a plane transverse to the rotation axis, said slits having a sufficient width to accommodate said shank portion and formed in opposite directions each from one end of said hole; at least one cam surface circumferentially extending from inside of the body towards a side surface of the body along an edge of at least one of said slits, said at least one cam surface cooperating with said shoulder to releasably clamp said protruding member.

2. A device according to claim 1, characterized in that said arcuate slits are formed along an arc of circle extending by about 90° from the axis of the through hole.

3. A device according to claim 1, characterized in that the cam surfaces are formed along the edges of both slits.

4. A device according to claim 1, characterized in that said at least one cam surface has from inside a first spiral extending section.

5. A device according to claim 4, characterized in that said at least one cam surface terminates with a planar section arranged parallel to the axis of said through hole.

6. A device according to any of the preceding claims, characterized in that the axis of said through hole and central axes of the arcuate slits lie in a plane perpendicular to the axis of rotation of the cylindrical body.

7. A device according to claim 1, wherein the protruding member is a pin.

* * * * *